United States Patent
Parker (10) Patent No.: US 8,184,528 B2
(45) Date of Patent: May 22, 2012

(54) NETWORK BACKHAUL SYSTEMS AND METHODS

(75) Inventor: Benjamin J. Parker, Foster City, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 459 days.

(21) Appl. No.: 12/414,307

(22) Filed: Mar. 30, 2009

(65) Prior Publication Data

US 2010/0248713 A1    Sep. 30, 2010

(51) Int. Cl.
*G01R 31/08*    (2006.01)
*G06F 11/00*    (2006.01)
*G08C 15/00*    (2006.01)
*H04J 1/16*    (2006.01)
*H04J 3/14*    (2006.01)
*H04L 1/00*    (2006.01)
*H04L 12/26*    (2006.01)
*H04W 4/00*    (2009.01)
*H04M 1/00*    (2006.01)
*H04B 1/38*    (2006.01)

(52) U.S. Cl. .................. 370/225; 370/331; 455/560
(58) Field of Classification Search .................. None
See application file for complete search history.

(56) References Cited

U.S. PATENT DOCUMENTS

| | | | |
|---|---|---|---|
| 7,835,272 B1 * | 11/2010 | Johnson et al. | 370/228 |
| 2004/0114748 A1 * | 6/2004 | Copley | 379/221.03 |
| 2006/0215548 A1 * | 9/2006 | Le Faucheur et al. | 370/228 |
| 2006/0227767 A1 | 10/2006 | Johnson et al. | |
| 2007/0030809 A1 * | 2/2007 | Dayama | 370/237 |
| 2007/0109959 A1 * | 5/2007 | Koren et al. | 370/218 |
| 2009/0003231 A1 * | 1/2009 | Hawbaker et al. | 370/252 |

OTHER PUBLICATIONS

Wikipedia, 2 pages, http://en.wikipedia.org/wiki/Backhaul_(telecommunications), as accessed on Feb. 19, 2009.
Wikipedia, 2 pages, http://en.wikipedia.org/wiki/Pseudowire, as accessed on Feb. 19, 2009.

* cited by examiner

*Primary Examiner* — Andrew Chriss (57) ABSTRACT

An exemplary system includes a mobile telephone switching office ("MTSO") subsystem having a first aggregation router and a second aggregation router, and a mobile telephone cell site router communicatively connected to the MTSO subsystem via a network backhaul connection. The cell site router is configured to establish at least one communication tunnel from the cell site router to the first aggregation router, establish at least one backup communication tunnel from the cell site router to the second aggregation router, detect at least one traffic forwarding failure associated with the communication tunnel, and redirect network backhaul traffic directed to the first aggregation router via the communication tunnel to the second aggregation router via the backup communication tunnel in response to the detected traffic forwarding failure. In certain embodiments, establishment of the backup communication tunnel includes pre-signaling the backup communication tunnel as backup to the communication tunnel.

15 Claims, 6 Drawing Sheets

NETWORK BACKHAUL SYSTEMS AND METHODS

BACKGROUND INFORMATION

Communication networks provide many people and organizations with access to a variety of applications and services. For example, with the proliferation of wireless communication networks such as mobile telephone networks, access to mobile communication applications and services has become widely available.

As mobile telephone networks have advanced, more applications and services have been made available over the mobile telephone networks, including applications and services that are increasingly bandwidth intensive. Increases in the number of applications and services, as well as increases in the bandwidth requirements for the applications and services available over mobile telephone networks have led network operators and service providers to seek additional advancements in mobile telephone network technologies to help support such applications and services. As a particular example, improvements to mobile telephone backhaul networks linking edge sub-networks to core networks are desirable to better support the increasing demands for bandwidth intensive mobile communication applications and services.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Exemplary network backhaul systems and methods are described herein.

An exemplary system includes a mobile telephone switching office subsystem having a first aggregation router and a second aggregation router, and a mobile telephone cell site router communicatively connected to the mobile telephone switching office subsystem via a network backhaul connection. The cell site router is configured to establish at least one communication tunnel from the cell site router to the first aggregation router over the network backhaul connection, establish at least one backup communication tunnel from the cell site router to the second aggregation router over the network backhaul connection, detect at least one traffic forwarding failure associated with the communication tunnel, and redirect network backhaul traffic directed to the first aggregation router via the communication tunnel to the second aggregation router via the backup communication tunnel in response to the detected traffic forwarding failure. In certain embodiments, establishment of the backup communication tunnel includes pre-signaling the backup communication tunnel as backup to the communication tunnel.

Another exemplary system includes a first mobile telephone switching office subsystem and a second mobile telephone switching office subsystem configured to receive and forward network traffic, and a hub router communicatively connected to the first and second mobile telephone switching office subsystems and to a plurality of mobile telephone cell site subsystems via at least one network backhaul connection. The hub router is communicatively disposed between each of the first and second mobile telephone switching office subsystems and the plurality of mobile telephone cell site subsystems. The hub router is configured to establish at least one communication tunnel from the hub router to the first mobile telephone switching office subsystem, establish at least one backup communication tunnel from the hub router to the second mobile telephone switching office subsystem, detect at least one traffic forwarding failure associated with the communication tunnel, and redirect network backhaul traffic directed to the first mobile telephone switching office subsystem via the communication tunnel to the second mobile telephone switching office subsystem the backup communication tunnel in response to the detected traffic forwarding failure. In certain embodiments, establishment of the backup communication tunnel includes pre-signaling the backup communication tunnel as backup to the communication tunnel.

An exemplary method may include establishing a communication path between a mobile telephone cell site router and a first aggregation router of a mobile telephone switching office subsystem, pre-signaling a backup communication path between the mobile telephone cell site router and a second aggregation router of the mobile telephone switching office subsystem, detecting a traffic forwarding failure associated with the communication path, and automatically redirecting network backhaul traffic directed to the first aggregation router via the communication path to the second aggregation router via the backup communication path in response to the traffic forwarding failure. In certain embodiments, establishment of the backup communication path includes pre-signaling the backup communication path as backup to the communication path.

In certain embodiments, the exemplary method further includes establishing at least one other backup communication path between the mobile telephone cell site router and a backup mobile telephone switching office subsystem, detecting a traffic forwarding failure associated with the backup communication path, and automatically redirecting network backhaul traffic directed to the mobile telephone switching office subsystem via the communication path or the backup communication path to the backup mobile telephone switching office subsystem via the other backup communication path in response to the traffic forwarding failure associated with the backup communication path. In certain embodiments, the other backup communication path is pre-signaled as backup to the communication path and the backup communication path.

These and other exemplary embodiments of network backhaul systems and methods will now be described in more detail with reference to the accompanying drawings.

In some examples, one or more of the exemplary systems described herein may include or be implemented in any computing hardware and/or instructions (e.g., software programs), or combinations of computing instructions and hardware, configured to perform one or more of the processes described herein. In particular, it should be understood that the exemplary systems, or one or more components of the exemplary systems, may be implemented on one physical computing device or may be implemented on more than one physical computing device. Accordingly, the exemplary systems may include any one of a number of computing devices employing any of a number of computer operating systems.

One or more of the processes described herein may be implemented at least in part as computer-executable instructions, i.e., instructions executable by one or more computing devices, tangibly embodied in a computer-readable medium. In general, a processor (e.g., a microprocessor) receives instructions, from a computer-readable medium (e.g., from a memory, etc.), and executes those instructions, thereby performing one or more processes, including one or more of the processes described herein. Such instructions may be stored and transmitted using a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computing device can read.

Accordingly, each of the components of the exemplary systems described herein may be implemented as hardware, computing instructions (e.g., software) tangibly embodied on a computer-readable medium, or a combination of hardware and tangibly embodied computing instructions configured to perform one or more of the processes described herein.

Figure 1:
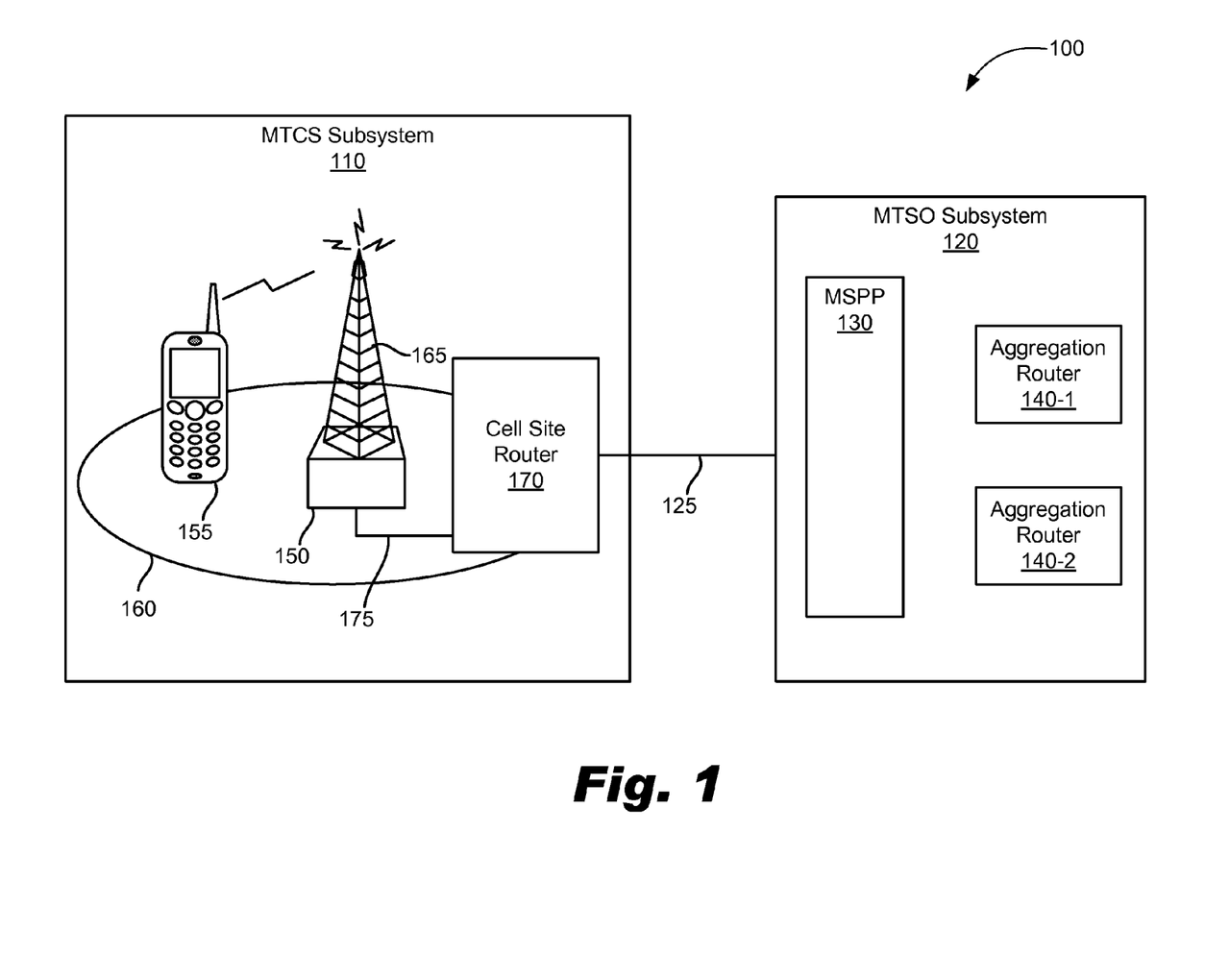
FIG. 1 illustrates an exemplary network backhaul system.

FIG. 1 illustrates an exemplary network backhaul system 100 (or simply "system 100"). In certain embodiments, system 100 may include or be implemented in a communication network such as a mobile telephone network. As shown in FIG. 1, system 100 may include a mobile telephone cell site ("MTCS") subsystem 110 ("cell site subsystem 110") and a mobile telephone switching office ("MTSO") subsystem 120 connected to one another by a network backhaul connection 125 ("connection 125"). Connection 125 may include and/or may be implemented over any suitable medium or media capable of carrying communication signals between cell site subsystem 110 and MTSO subsystem 120, including optical fiber, microwave, and/or other broadband media. Hence, connection 125 may carry network traffic between cell site subsystem 110 and MTSO subsystem 120.

In particular, connection 125 may be used to transport network backhaul traffic between cell site subsystem 110 and MTSO subsystem 120. For example, within a context of a communications network such as a mobile telephone network, cell site subsystem 110 may include or be part of an edge sub-network (e.g., a geographically distributed access network) from which network backhaul traffic may be transported upstream via network backhaul connection 125 to MTSO subsystem 120.

MTSO subsystem 120 may be configured to receive and forward network traffic, including receiving and forwarding network backhaul traffic. For example, network backhaul traffic may be received and forwarded upstream to one or more core and/or backbone network devices (e.g., Public Switched Telephone Network ("PSTN") devices). In this manner, MTSO subsystem 120 may connect a wireless voice call to the PSTN and/or other core or backbone network.

MTSO subsystem 120 may be configured to function as a centralized switch supporting multiple cell site subsystems such as cell site subsystem 110. As such, MTSO subsystem 120 may control operations of a mobile telephone network, including, but not limited to, provisioning, connecting, monitoring, routing, handing off, and tearing down communication circuits, sessions, and services.

MTSO subsystem 120 may be located at a particular geographic location. For example, MTSO subsystem 120 may be housed at a mobile telephone switching office.

As shown in FIG. 1, MTSO subsystem 120 may include a multi-service provisioning platform 130 ("MSPP 130") and first and second aggregation routers 140-1 and 140-2 (collectively "aggregation routers 140"). MSPP 130 and aggregation routers 140, which may include or be implemented using any suitable computing hardware, computing instructions (e.g., software), or combination thereof, may be configured to perform one or more operations on network traffic, including but not limited to forwarding, routing, and switching network traffic. MSPP 130 and aggregation routers 140 may perform such operations at one or more layers associated with network traffic, including one or more Open Systems Interconnection ("OSI") Model layers.

MSPP 130 may be configured to provision one or more services, including provisioning network resources for use by the services. For example, MSPP 130 may be configured to provision bundled services for one or more subscribers at various network layers (e.g., transport, switching, and routing layers of a network). MSPP 130 may be configured to steer communication tunnels and network traffic to appropriate routers, such as aggregation routers 140.

MSPP 130 may be configured to handle and/or terminate a range of physical interfaces, including, but not limited to optical interfaces (e.g., synchronous optical networking ("SONET") interfaces and optical carrier level interfaces (e.g., OC-3, OC-12, OC-48, OC-192)), digital subscriber line ("DSL") interfaces, asynchronous transfer mode ("ATM") interfaces, and Ethernet interfaces (e.g., 10/100Base-T and gigabit Ethernet interfaces), for example. In certain embodiments, MSPP 130 may be configured to function as an add/drop multiplexer configured to multiplex network traffic for various optical interfaces and/or protocols (e.g., from SONET to OC-48 or OC-192).

Aggregation routers 140 may be configured to receive and forward network traffic, including network backhaul traffic received from cell site subsystem 110. For example, network backhaul traffic may be received by an aggregation router 140 and selectively forwarded to a destination such as a core and/or backbone network device. Examples of such core and/or backbone network devices may include, but are not limited to, Class-5 switches, radio network controllers, and signaling gateways. In certain embodiments, aggregation routers 140 may include or be implemented on one or more multi-layer switches ("MLSs") such as one or more next generation MLSs ("ngMLSs").

In certain embodiments, cell site subsystem 110 may include a mobile telephone base station subsystem 150 ("base station subsystem 150") configured to send and receive wireless communication signals to/from one or more communication devices 155 located within a geographic cell 160. Base station subsystem 150 may include one or more components configured to support sending and receiving wireless communication signals to/from communication devices 155 located within cell 160. Such components may include, but are not limited to, one or more transmitters, receivers, transceivers, antennae (e.g., antenna 165), signal processors, and controllers.

Communication device 155 may include any device configured to communicate with base station subsystem 150 when located within cell 160. Examples of communication devices 155 may include, but are not limited to, wireless communication devices, mobile communication devices (e.g., mobile telephones such as cellular telephones), personal digital assistants, computers (e.g., laptop computers), and vehicular communication devices.

Communications between communication device 155 and base station subsystem 150 may include bearer (e.g., voice, data, and/or media) and/or operation, administration, and maintenance ("OAM") traffic. Any suitable wireless communication signals, protocols, and/or technologies may be used for the communications. Examples of such communication protocols and technologies, include, but are not limited to, Global System for Mobile Communications ("GSM") technologies (e.g., Long Term Evolution ("LTE")), Code Division Multiple Access ("CDMA") technologies, Time Division Multiple Access ("TDMA") technologies, Short Message Service ("SMS"), Multimedia Message Service ("MMS"), Evolution Data Optimized Protocol ("EVDO") (e.g., "1xEVDO"), radio frequency ("RF") signaling technologies, radio transmission technologies (e.g., One Times Radio Transmission Technology ("1xRTT")), Transmission Control Protocol ("TCP"), Internet Protocol ("IP"), File Transfer Protocol ("FTP"), Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), and other suitable communications protocols and technologies.

Communications with base station subsystem 150 may provide communication device 155 with access to one or more of a plurality of services provided over a communication network such as a mobile telephone network. Examples of such services include, but are not limited to, voice communication services (e.g., cellular telephone service and/or Voice over Internet Protocol ("VoIP")), data services, text messaging services (e.g., SMS), and media messaging services (e.g., MMS). In certain examples, specific services provided over a communication network may correspond to specific communication technologies used to deliver those services. For instance, communications technologies such as EVDO, 1xRTT, and LTE may support and/or be used to deliver specific services (e.g., EVDO based services, 1xRTT based services, and LTE based services) to communication device 155 via a communication network. Accordingly, a user of communication device 155 (e.g., an end user such as a subscriber to one or more services) may obtain access to one or more services provided over a communication network.

Cell site subsystem 110 may further include a cell site router 170, which may include or be implemented using any suitable computing hardware, computing instructions (e.g., software), or combination thereof. Cell site router 170 may be physically deployed within geographic cell 160 in certain embodiments.

Cell site router 170 may be configured to perform one or more operations on network traffic, including but not limited to forwarding, routing, and switching network traffic. Cell site router 170 may perform such operations at one or more layers associated with network traffic, including one or more OSI Model layers. Exemplary operations of cell site router 170 will be described further below.

Cell site router 170 may be connected to base station subsystem 150 by a cell site connection 175. Cell site connection 175 may include and/or may be implemented over any suitable medium or media capable of carrying communication signals between cell site router 170 and base station subsystem 150. In certain examples, cell site connection 175 may include a legacy cell site connection over a legacy medium, such as DS-1 over copper wires, for example. In such examples, instead of a legacy connection and/or medium extending beyond cell 160 and for termination at MTSO subsystem 120, cell site router 170 may terminate the legacy connection and/or medium within cell 160. Accordingly, broadband connections (e.g., network backhaul connection 125) may be deployed and used to connect cell site subsystem 110 to MTSO subsystem 120 without having to upgrade legacy connections and/or media within cell 160. Hence, network backhaul connection 120 and cell site connection 175 may comprise diverse connection technologies, and base station subsystem 150 may continue to utilize a legacy communication connection, session, and or medium to transmit network backhaul traffic. This configuration may provide significant cost savings associated with conversions of legacy backhaul network links to broadband backhaul network links capable of supporting bandwidth intensive services and traffic.

In certain other examples, cell site connection 175 may include a next generation communication connection over a broadband medium, such as Ethernet over a broadband medium, for example. Such a connection may also be terminated by cell site router 170. As described further below, connection 125 and one or more communication tunnels carried over connection 125 may be configured to support various communication protocols and technologies, including legacy and next generation communication protocols and technologies. Accordingly, base station subsystems utilizing diverse backhaul communication technologies (e.g., legacy and next generation communication technologies) may be connected to a cell site router 170.

In certain embodiments, base station subsystem 150 may be configured to utilize multi-link point-to-point protocol ("MLPPP") to encapsulate network backhaul traffic (e.g., Internet Protocol ("IP") payloads) for transmission to cell site router 170. Instead of base station subsystem 150 transmitting such traffic directly to MTSO subsystem 120 over a backhaul link as may be done in legacy backhaul networks, the traffic from base station subsystem 150 may be transmitted to the cell site router 170 terminating cell site connection 175 in cell 160. Cell site router 170 may then control how network backhaul traffic is processed and transmitted over connection 125 independently of a particular network backhaul protocol, medium, and/or technology used by base station subsystem 150.

As shown in FIG. 1, cell site router 170 may be connected to MTSO subsystem 120 via network backhaul connection 125. Accordingly, connection 125 may be used to carry network traffic between cell site router 170 and MTSO subsystem 120, including carrying network backhaul traffic from the cell site router 170 within cell 160 to MTSO subsystem 120. Thus, base station subsystem 150 may transmit network backhaul traffic to cell site router 170 via cell site connection 175, and cell site router 170 may transmit corresponding network backhaul traffic to MTSO subsystem 120 via network backhaul connection 125.

Cell site router 170 may be configured to establish one or more communication tunnels over connection 125 for use in carrying network traffic between the cell site router 170 and MTSO subsystem 120. In certain embodiments, for example, cell site router 170 may be configured to establish at least one communication tunnel from the cell site router 170 to aggregation router 140-1 and at least one backup communication tunnel from the cell site router 170 to aggregation router 140-2 over network backhaul connection 125.

Figure 2:
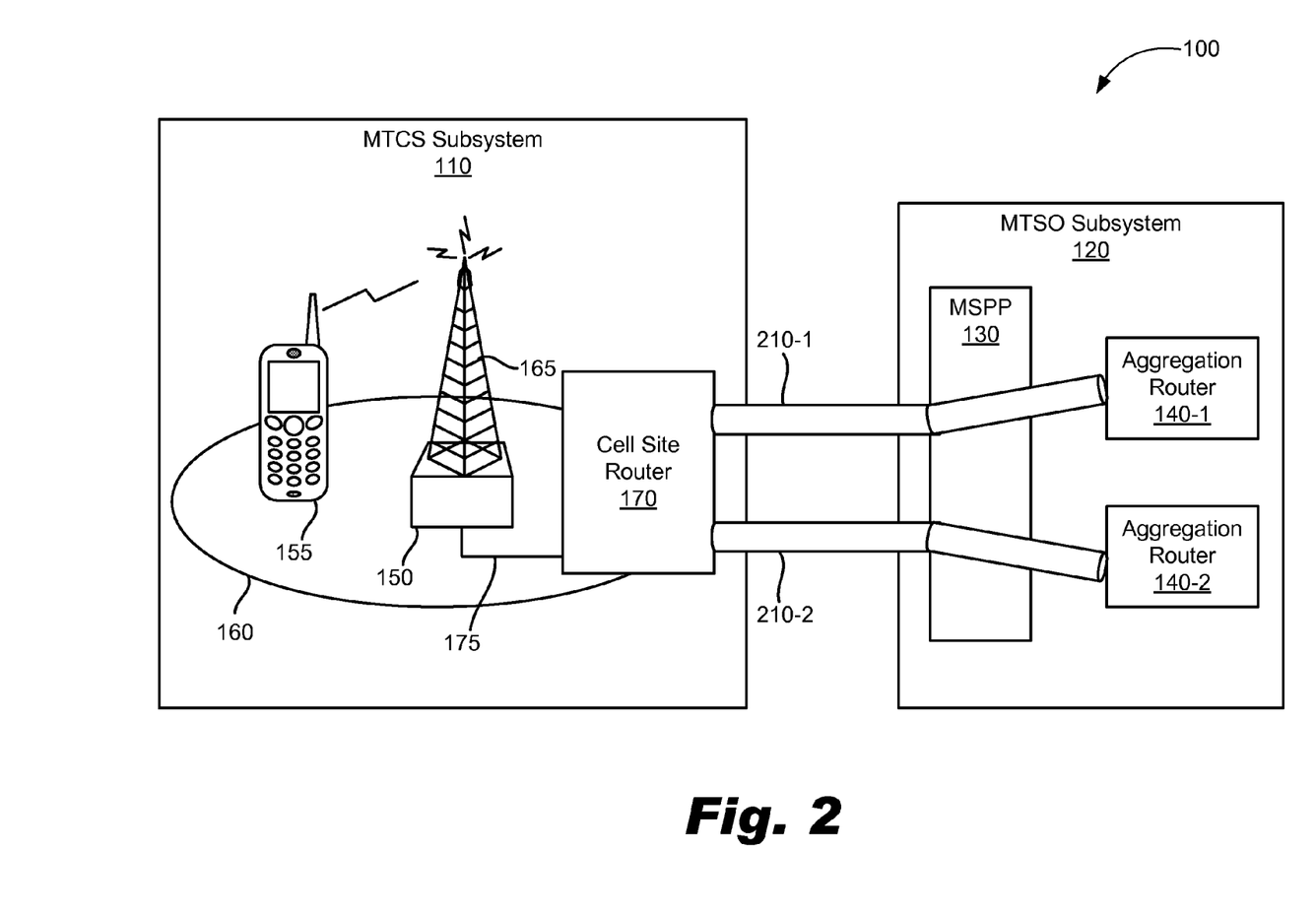
FIG. 2 illustrates exemplary communication tunnels within the system of FIG. 1.

FIG. 2 illustrates exemplary communication tunnels 210-1 and 210-2 (collectively "communication tunnels 210") established by the cell site router 170 within system 100. As shown in FIG. 2, communication tunnel 210-1 may form a communication path between cell site router 170 and aggregation router 140-1 and communication tunnel 210-2 may form a communication path between cell site router 170 and aggregation router 140-2.

Communication tunnel 210-2 may be established as a backup to communication tunnel 210-1. Accordingly, backup communication tunnel 210-2 may be established to have properties at least substantially similar to the properties of communication tunnel 210-1 such that backup communication tunnel 210-2 is capable of functioning as a backup to communication tunnel 210-1.

In certain embodiments, cell site router 170 may establish communication tunnel 210-2 in response to establishment of communication tunnel 210-1. For example, cell site router 170 may signal aggregation router 140-1 to establish communication tunnel 210-1 between the cell site router 170 and aggregation router 140-1. Responsive to this establishment of communication tunnel 210-1, cell site router 170 may pre-signal establishment of communication tunnel 210-2 (e.g., pre-signal aggregation router 140-2 to establish communication tunnel 210-2) between the cell site router 170 and aggregation router 140-2 as a backup to communication tunnel 210-1. As used herein, "pre-signaling" a communication tunnel (e.g., communication tunnel 210-2) may refer to signaling that is performed to establish communication tunnel 210-2 without association to (e.g., before existence of) a pending operation to transmit network traffic over communication tunnel 210-2. Accordingly, communication tunnel 210-2 may be established in advance such that it is available for, and configured to support a future, substantially hitless transition and redirection of network traffic from communication tunnel 210-1 to backup communication tunnel 210-2.

A communication tunnel 210 may include a discrete communication link suitable for transporting network traffic between endpoints (e.g., cell site router 170 and MTSO subsystem 120). In certain embodiments, a communication tunnel 210 may include a pseudowire connecting and configured to carry traffic associated with a native service between two endpoints over a packet-switched network connection. As used herein, a "pseudowire" refers to a discrete type of communication link configured to emulate a native service over a packet-switched network, including any of the exemplary services disclosed above. Hence, in certain embodiments, communication tunnel 210-1 may include a pseudowire, and communication tunnel 210-2 may include a backup pseudowire pre-signaled as a backup to the pseudowire. In certain embodiments, a communication tunnel 210 may include a virtual circuit connecting two endpoints (e.g., an Ethernet virtual circuit connecting cell site router 170 and MTSO subsystem 120). In such embodiments, communication tunnel 210-1 may include an Ethernet virtual circuit, and communication tunnel 210-2 may include a backup Ethernet virtual circuit. In certain embodiments, a communication tunnel 210 may include a pseudowire carried by an Ethernet virtual circuit. In such embodiments, communication tunnel 210-1 may include an Ethernet virtual circuit and at least one pseudowire carried over the Ethernet virtual circuit, and communication tunnel 210-2 may include a backup Ethernet virtual circuit and at least one backup pseudowire carried over the backup Ethernet virtual circuit.

In certain examples, cell site router 170 may establish a plurality of pseudowires between the cell site router 170 and aggregation router 140-1. Each of the pseudowires may correspond to a different one of a plurality of services provided over a communication network such as a mobile telephone network. For example, separate pseudowires maybe established for EVDO, 1xRTT, and LTE based services. In certain embodiments, the plurality of pseudowires may be carried by a single Ethernet virtual circuit between the cell site router 170 and aggregation router 140-1.

In response to the establishment of the plurality of pseudowires between the cell site router 170 and aggregation router 140-1, cell site router 170 may pre-signal aggregation router 140-2 to establish a plurality of corresponding backup pseudowires between the cell site router 170 and aggregation router 140-2 as backup to the plurality of pseudowires between the cell site router 170 and aggregation router 140-1.

Cell site router 170 and one or more elements of MTSO subsystem 120 may be configured to establish communication tunnels 210 and to process (e.g., forward) network traffic using one or more suitable network communication technologies. In certain embodiments, multi-protocol label switching ("MPLS") may be used for processing network traffic transported or to be transported over a communication tunnel 210. Hence, the communication tunnel 210 may form an MPLS communication path. In some embodiments, cell site router 170 may be configured to establish or otherwise manage such an MPLS path using a Label Distribution Protocol ("LDP"). This is illustrative only as other MPLS management technologies may be used in other embodiments.

With an MPLS path established, network traffic may be transported between the cell site router 170 and MTSO subsystem 120 via the MPLS path. Cell site router 170 may be configured as a backhaul network edge router capable of adding MPLS labels to data packets to be transported over an MPLS path. Accordingly, MPLS-labeled network traffic may be transported over the predefined MPLS path (e.g., a path formed by a communication tunnel 210 such as a pseudowire and/or Ethernet virtual circuit) without dependence on a particular type of traffic, transport medium, or protocol. Accordingly, diverse types of services, protocols, media, and network traffic may be supported.

Cell site router 170 may be configured to detect communication failures associated with a communication tunnel 210. For example, cell site router 170 may be configured to detect at least one traffic forwarding failure associated with communication tunnel 210-1. A traffic forwarding failure may include any failure that prevents, or may potentially prevent, successful delivery of network traffic over a communication tunnel 210. The error detection may be performed in any suitable way using any suitable technologies. In certain embodiments, for example, cell site router 170 may be configured to use Bidirectional Forwarding Detection ("BFD") to detect communication errors associated with communication tunnel 210-1. To this end, cell site router 170 may establish a session between the cell site router 170 and aggregation router 140-1 over communication tunnel 210-1. Cell site router 170 may then monitor for communication failures in accordance with one or more predefined failure criteria. For example, failure criteria may include a maximum ping time period (e.g., a time within a range of 50-100 milliseconds) and a threshold number of detected failures (e.g., three failures).

When cell site router 170 detects at least one traffic forwarding failure associated with communication tunnel 210-1 and satisfying the predefined failure criteria, cell site router 170 may automatically redirect network backhaul traffic directed to aggregation router 140-1 via communication tunnel 210-1 to aggregation router 140-2 via backup communication tunnel 210-2 in response to the traffic forwarding failure. This transfer from communication tunnel 210-1 to communication tunnel 210-2 may be hitless in some examples at least because communication tunnel 210-2 has been established in advance as a backup to communication tunnel 210-1, as described above.

Cell site router 170 may be similarly configured to detect communication failures associated with one or more other communication tunnels 210, including backup communication tunnel 210-2.

Figure 3:
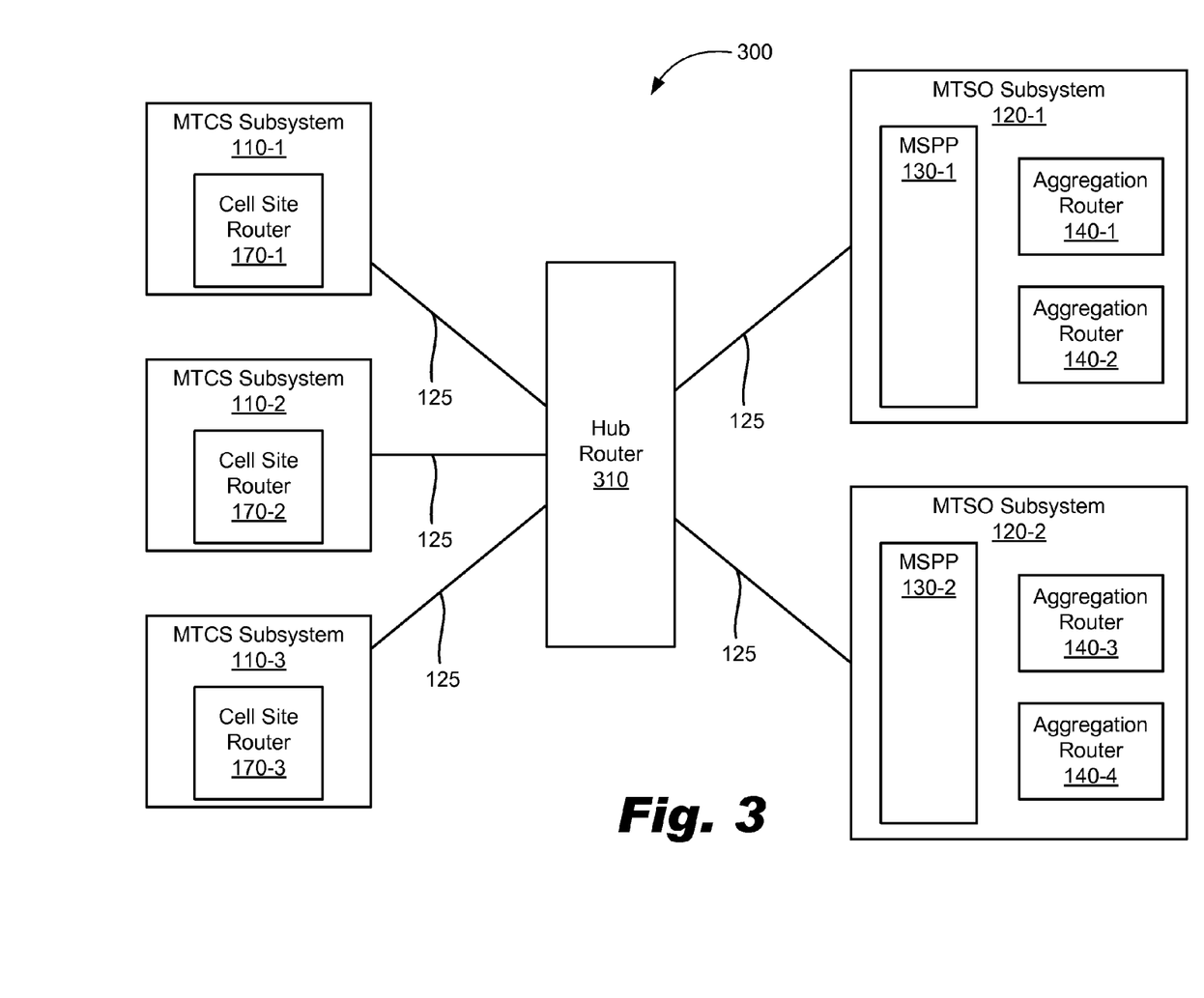
FIG. 3 illustrates another exemplary network backhaul system.

FIG. 3 illustrates another exemplary network backhaul system 300 ("or simply "system 300"). As shown in FIG. 3, system 300 may include a hub router 310 communicatively connected to each of a plurality of MTCS subsystems 110 (e.g., MTCS subsystems 110-1, 110-2, and 110-3) via a respective network backhaul connection 125. Hub router 310 is also communicatively connected to each of a plurality of MTSO subsystems 120 (e.g., first and second MTSO subsystems 120-1 and 120-2) via a respective network backhaul connection 125. As shown in FIG. 3, hub router 310 may be communicatively disposed between the MTCS subsystems 110-1, 110-2, and 110-3 and the MTSO subsystems 120-1 and 120-2.

The MTSO subsystems 110, network backhaul connections 125, and MTSO subsystems 120-1 shown in FIG. 3 may be configured in any of the ways described above. In particular, each of the MTCS subsystems 110-1 may include a cell site router 170. In FIG. 3, MTCS subsystems 110-1, 110-2, and 110-3 include cell site routers 170-1, 170-2, and 170-3, respectively. Each of the cell site routers 170-1, 170-2, and 170-3 may be communicatively connected to hub router 310 via a respective connection 125.

In certain embodiments, the MTCS subsystems 110-1, 110-2, and 110-3, hub router 310, and MTSO subsystems 120-1 and 120-2 are located at and/or configured to serve geographically diverse locations. For example, each of the MTCS subsystems 110-1, 110-2, and 110-3 may be located within a different geographic cell 160, and each of the MTSO subsystems 120-1 and 120-2 may be located at a different geographic location (e.g., geographically diverse mobile telephone switching offices). In certain embodiments, hub router 310 may be located at an intermediate geographic location (e.g., a co-location site) that is remote of the geographic cells 160 associated with MTCS subsystems 110-1, 110-2, and 110-3 and of the geographic locations of MTSO subsystems 120-1 and 120-2. In other embodiments, hub router 310 may be located within a geographic cell 160 associated with one of the MTCS subsystems 110-1, 110-2, and 110-3. For example, hub router 310 may be implemented in one of the MTCS subsystems 110-1, 110-2, and 110-3.

Hub router 310, which may include or be implemented using any suitable computing hardware, computing instructions (e.g., software), or combination thereof, may be configured to perform one or more operations on network traffic, including but not limited to aggregating, forwarding, routing, and switching network traffic. In particular, hub router 310 may be configured to aggregate network backhaul traffic received from cell site routers 170-1, 170-2, and 170-3 located at subtended cell sites. Hub router 310 may perform such operations at one or more layers associated with network traffic, including at one or more OSI Model layers. In certain examples, hub router 310 may include one or more multilayer switches.

Cell site routers 170-1, 170-2, and 170-3 may each be configured to establish at least one communication tunnel over a respective connection 125 to the hub router 310. Cell site routers 170-1, 170-2, and 170-3 may establish the communications tunnels with hub router 310 in any of the ways described above.

Hub router 310 may be configured to establish at least one communication tunnel between the hub router 310 and each of the MTSO subsystems 120-1 and 120-2. In certain embodiments, hub router 310 may be configured to establish one or more communication tunnels from the hub router 310 to one or more aggregation routers 140-1 and 140-2 of a first MTSO subsystem 120-1 and one or more communication tunnels from the hub router 310 to one or more aggregation routers 140-3 and 140-4 of a second MTSO subsystem 120-2. The connection tunnels may be configured in any of the ways described above to carry network traffic (e.g., network backhaul traffic) between the respective cell site routers 170 and the MTSO subsystems 120 via the hub router 310.

Figure 4:
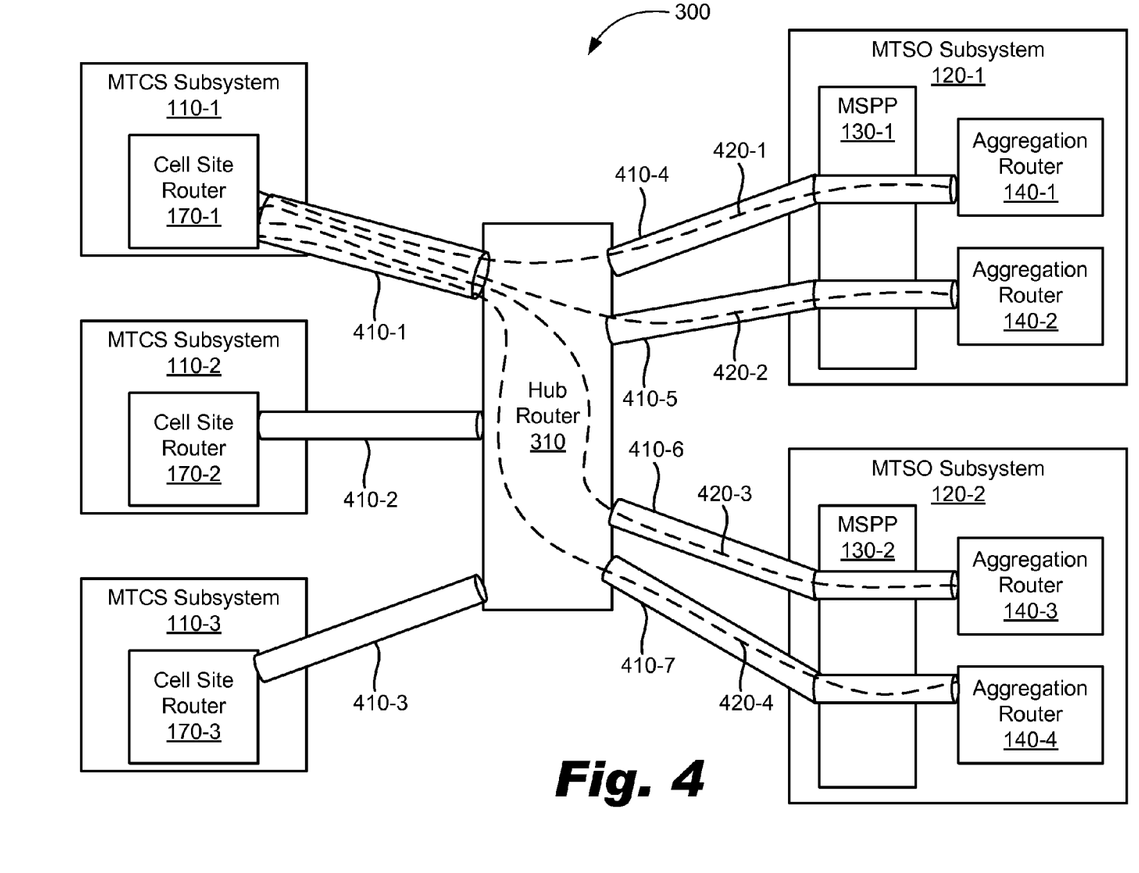
FIG. 4 illustrates exemplary communication tunnels within the system of FIG. 3.

FIG. 4 illustrates exemplary communication tunnels 410-1 through 410-7 (collectively "communication tunnels 410") established in system 300. As shown in FIG. 4, communication tunnel 410-1 may form a communication path between cell site router 170-1 and hub router 310, communication tunnel 410-2 may form a communication path between cell site router 170-2 and hub router 310, and communication tunnel 410-3 may form a communication path between cell site router 170-3 and hub router 310. The communication tunnels 410-1, 410-2, and 410-3 connecting cell site routers 170-1, 170-2, and 170-3 with hub router 310 may be respectively established by cell site routers 170-1, 170-2, and 170-3 in any of the ways described above.

As further shown in FIG. 4, communication tunnel 410-4 may form a communication path between hub router 310 and a first aggregation router 140-1 of MTSO subsystem 120-1, and communication tunnel 410-5 may form a communication path between hub router 310 and a second aggregation router 140-2 of MTSO subsystem 120-1. Similarly, communication tunnel 410-6 may form a communication path between hub router 310 and a first aggregation router 140-3 of MTSO subsystem 120-2, and communication tunnel 410-7 may form a communication path between hub router 310 and a second aggregation router 140-4 of MTSO subsystem 120-2. The communication tunnels 410-4, 410-5, 410-6, and 410-7 connecting hub router 310 with MTSO subsystems 120-1 and 120-2 may be established by hub router 310 in any of the ways described above, including respectively signaling and/or pre-signaling aggregation router 140-1, 140-2, 140-3, and 140-4 to establish the communication tunnels 410-4, 410-5, 410-6, and 410-7.

Hub router 310 may be configured to selectively associate one or more of the communication tunnels 410-1, 410-2, and 410-3 established between cell site routers 170-1, 170-2, and 170-3 and hub router 310 with one or more of the communication tunnels 410-4, 410-5, 410-6, and 410-7 established between hub router 310 and MTSO subsystems 120-1 and 120-2 to form one or more communication paths between cell site routers 170-1, 170-2, and 170-3 and MTSO subsystems 120-1 and 120-2. For example, hub router 310 may associate communication tunnel 410-1 with communication tunnel 410-4 to form a first communication path 420-1 between MTCS subsystem 110-1 and MTSO subsystem 120-1. Additionally or alternatively, hub router 310 may associate communication tunnel 410-1 with communication tunnel 410-5 to form a second communication path 420-2 between MTCS subsystem 110-1 and MTSO subsystem 120-1. Hub router 310 may similarly associate communication tunnel 410-1 with communication tunnel 410-6 to form communication path 420-3 between MTCS subsystem 110-1 and MTSO subsystem 120-2. Additionally or alternatively, hub router 310 may associate communication tunnel 410-1 with communication tunnel 410-7 to form a second communication path 420-4 between MTCS subsystem 110-1 and MTSO subsystem 120-1. Communication paths 420-1, 420-2, 420-3, and 420-4, which may be collectively referred to as "communication paths 420," may comprise MPLS paths as described above. Hub router 320 may associate other sets of communications tunnels 410 to form similar communication paths between MTCS subsystems 110-2 and 110-3 and MTSO subsystems 120-1 and 120-2.

One or more of the communication tunnels 410 and/or communication paths 420 may be established as backup to one or more other communication tunnels 410 and/or communication paths 420. For example, communication tunnel 410-5 may be established as a backup to communication tunnel 410-4. Accordingly, communication path 420-2 may be a backup to communication path 420-1. As another example, communication tunnel 410-7 may be established as a backup to communication tunnel 410-6. Accordingly, communication path 420-4 may be a backup to communication path 420-3. As yet another example, communication tunnels 410-6 and 410-7 may be established as backup to communication tunnels 410-4 and 410-5. Accordingly, communication paths 420-3 and/or 420-4 may be established as backup to communication paths 420-1 and/or 420-2.

In certain embodiments, one or more backup communication tunnels 410 and/or backup communication paths 420 may be established in response to establishment of one or more other communication tunnels 410 and/or communication paths 420. For example, hub router 310 may signal aggregation router 140-1 to establish communication tunnel 410-4 between the hub router 310 and aggregation router 140-1. Responsive to this establishment of communication tunnel 410-4, hub router 310 may pre-signal aggregation router 140-2 to establish communication tunnel 410-5 between the hub router 310 and aggregation router 140-2 as backup to communication tunnel 410-4. Additionally or alternatively, responsive to the establishment of communication tunnel 410-4, hub router 310 may pre-signal aggregation router 140-3 and/or aggregation router 140-4 to establish communication tunnel 410-6 and/or communication tunnel 410-7 between the hub router 310 and aggregation router 140-3 and/or aggregation router 140-4 as backup to communication tunnel 410-4.

A communication tunnel 410 may include any discrete communication link suitable for transporting network traffic between endpoints (e.g., between a cell site router 170 and the hub router 310 and/or between the hub router 410 and a MTSO subsystem 120). A communication tunnel 410 may be configured in any of the ways described above in reference to a communication tunnel 210. Hence, in certain embodiments, a communication tunnel 410 may include one or more pseudowires and/or one or more virtual circuits (e.g., Ethernet virtual circuits) connecting two endpoint devices and configured to carry traffic associated with one or more native services over a packet-switched network connection.

Hub router 310 may be configured to detect one or more communication failures associated with communication tunnels 410-4, 410-5, 410-6, and/or 410-7. For example, hub router 310 may be configured to detect at least one traffic forwarding failure associated with communication tunnel 410-4. The error detection may be performed in any suitable way using any suitable technologies. In certain embodiments, hub router 310 may be configured to use BFD to detect communication errors associated with communication tunnel 410-4. To this end, hub router 310 may establish a session between the hub router 310 and aggregation router 140-1 over communication tunnel 410-4. Hub router 310 may then monitor for communication failures in accordance with one or more predefined failure criteria, including any of the exemplary failure criteria described above.

When hub router 310 detects at least one traffic forwarding failure associated with communication tunnel 410-4 and satisfying the predefined failure criteria, hub router 310 may automatically redirect network backhaul traffic directed to aggregation router 140-1 via communication tunnel 410-4 to a backup device over a backup communication tunnel. For example, hub router 310 may automatically redirect network backhaul traffic directed to aggregation router 140-1 via communication tunnel 410-4 to aggregation router 140-2 via backup communication tunnel 410-5 in response to the traffic forwarding failure. This transfer from communication tunnel 410-4 to communication tunnel 410-5 may be substantially hitless in some examples at least because communication tunnel 410-5 has been established in advance as backup to communication tunnel 410-4.

Hub router 310 may be configured to detect a communication failure with an MTSO subsystem 120. The error detection may be performed in any of the ways described above, including using BFD to detect communication errors that satisfy predefined criteria and are associated with communication tunnels 410 terminated at the MTSO subsystem 120.

As an example, hub router 310 may detect traffic forwarding errors associated with communication tunnels 410-4 and 410-5 and satisfying the predefined failure criteria. For instance, hub router 310 may detect a first traffic forwarding failure associated with communication tunnel 410-4 and a second traffic forwarding failure associated with communication tunnel 410-5. Based on the detected errors, hub router 310 may identify a complete communication failure with MTSO subsystem 120-1. In response, hub router 310 may automatically redirect network backhaul traffic directed to MTSO subsystem 120-1 to MTSO subsystem 120-2 via at least one of communication tunnels 410-6 and 410-7. This transition from one or more communication tunnels 410-4 and 410-5 terminated at MTSO subsystem 120-1 to one or more communication tunnels 410-6 and 410-7 may be substantially hitless in some examples at least because communication tunnels 410-6 and 410-6 have been pre-signaled and established in advance as backup to communication tunnels 410-4 and 410-5 terminated at MTSO subsystem 120-1. Accordingly, MTSO subsystem 120-2 may function as a geographically diverse backup to MTSO subsystem 120-1.

In certain embodiments, network backhaul traffic may be load balanced over multiple communication tunnels. In system 300, for example, hub router 310 may be configured to load balance network backhaul traffic between MTSO subsystems 120-1 and 120-2. Additionally or alternatively, hub router 310 may be configured to load balance network backhaul traffic between multiple aggregation routers 140 of an MTSO subsystem 120 (e.g., between aggregation routers 140-1 and 140-2 of MTSO subsystems 120-1). As another example, in system 100, cell site router 170 may be configured to load balance network backhaul traffic between aggregation routers 140-1 and 140-2 of MTSO subsystem 120.

As mentioned above, an MTSO subsystem 120 may be configured to control operations of a mobile telephone network, including provisioning, connecting, monitoring, routing, handing off, and tearing down communication circuits, sessions, and services associated with cell sites served by the MTSO subsystem 120. In certain exemplary embodiments, one or more of such control operations may be offloaded from the MTSO subsystem 120. In certain examples, such offloading may help reduce latency, alleviate congestion, and improve performance associated with network backhaul traffic.

For example, in certain embodiments, hub router 310 may be configured to break out select network traffic for management by the hub router 310. As used herein, a "break out" of select network traffic by hub router 310 may comprise a redirection of select network traffic downstream such that the select network traffic is not forwarded upstream to either of MTSO subsystems 120-1 or 120-2. Hub router 310 may be configured to establish one or more communication tunnels and/or communication paths to support a break out of select network traffic for management by hub router 310.

As an example, in system 300, hub router 310 may be configured to control certain operations associated with select network traffic of a mobile telephone network, while MTSO subsystems 120-1 and/or 120-2 control operations associated with other network traffic. In particular, hub router 310 may be configured to break out network traffic associated with endpoint devices located exclusively within the one or more of the geographic cell 160 associated with MTCS subsystems 110 subtended to hub router 310.

For instance, a subscriber to a wireless voice communication service may use a communication device 155 located within a geographic cell 160 served by MTCS subsystem 110-1 to initiate a voice call directed to another subscriber associated with another communication device 155 located within another geographic cell 160 served by MTCS subsystem 110-2. Hub router 310 may receive a voice call request from MTCS subsystem 110-1 and determine that the requested voice call is to be between communication devices 155 located within geographic cells 160 served by MTCS subsystems 110-1 and 110-2, which are both subtended to and served by hub router 310. In response, rather than forward the request upstream to one of the MTSO subsystem 120-1 and 120-2, hub router 310 may take control of signaling to establish a communication path between MTCS subsystem 110-1 and MTCS subsystem 110-2 to be used for the requested voice call. The hub router 310 may then break out network traffic associated with the voice call (e.g., voice bearer traffic) for transport over the communication path between MTCS subsystem 110-1 and MTCS subsystem 110-2. Accordingly, hub router 310 may perform a breakout of select network traffic closer to one or more edges of a mobile telephone network and thereby reduce network traffic to/from MTSO subsystems 120-1 and/or 120-2.

Figure 5:
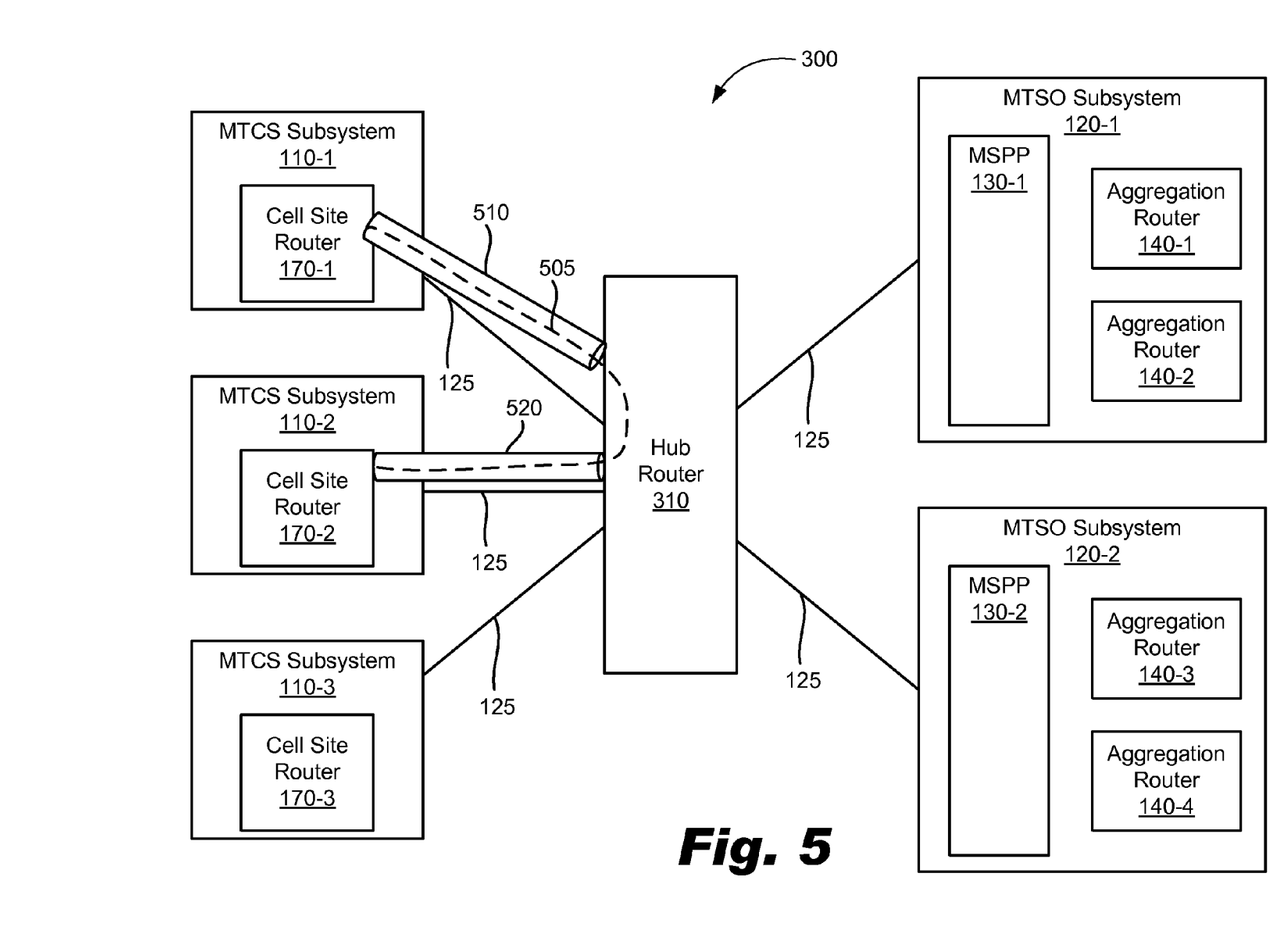
FIG. 5 illustrates an exemplary communication path within the system of FIG. 1.

FIG. 5 illustrates an exemplary network communication path 505 controlled and managed by hub router 310 rather than by MTSO subsystem 120-1 or 120-2 in system 300. Communication path 505 may be formed by a first communication tunnel 510 providing a communication link between cell site subsystem 110-1 and hub router 310 and a second communication tunnel 510 providing a communication link between hub router 310 and cell site subsystem 110-2. Hub router 310 may be configured to establish and associate communications tunnel 510 and 520 with one another in any of the ways described herein to form communication path 505. Hub router 310 may then break out select network traffic for transport over the communication path 505.

In other embodiments, MTSO subsystem 120-1 and/or 120-2 may still control signaling to establish communication path 505 for such a voice call, and hub router 310 may be configured to take over control of the communication path 505 after the path 505 has been established and/or to break out select network traffic for transport over the communication path 505.

In certain embodiments, hub router 310 may be configured to use MPLS labels to selectively breakout select network traffic. As described above, cell site routers 170 may be configured to append MPLS labels to network backhaul traffic. Hub router 310 may be configured to identify from the MPLS labels select traffic that may be broken out at the hub router 310.

Any suitable computing hardware, computing instructions (e.g., software), or combination thereof, may be implemented at hub router 310 and used to support breakout of select traffic at the hub router 310 as described above. For example, hub router 310 include one or more switches (e.g., a MLS), gateways, and/or other network elements, including, but not limited to, a system architecture evolution ("SAE") gateway, mobility management entity ("MME"), serving gateway ("S-GW"), MSPP, and/or Packet Data Network ("PDN") gateway.

Figure 6:
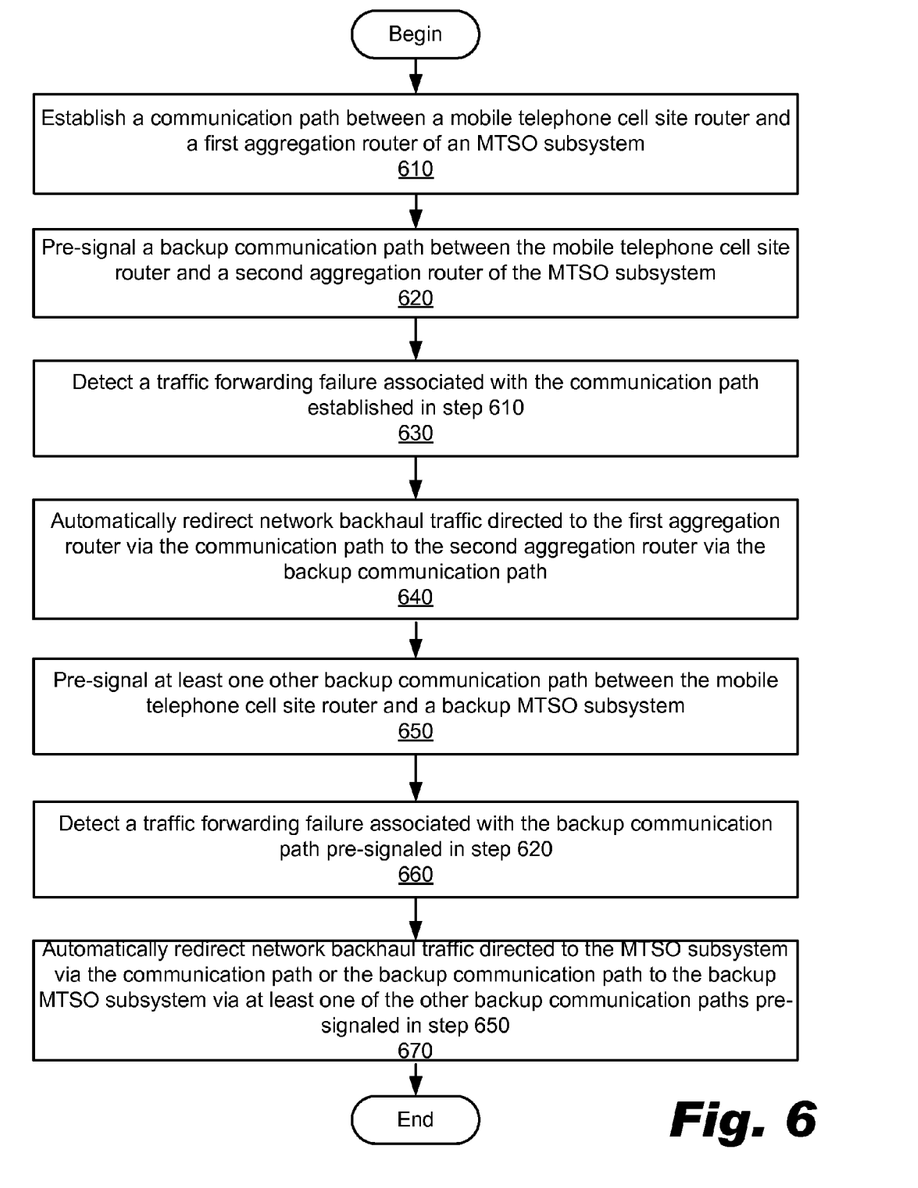
FIG. 6 illustrates an exemplary network backhaul method.

FIG. 6 illustrates an exemplary network backhaul method. While FIG. 6 illustrates exemplary steps according to one embodiment, other embodiments may omit, add to, reorder, and/or modify any of the steps shown in FIG. 6. In certain embodiments, a cell site router 170 and/or hub router 310 may perform one or more of the steps shown in FIG. 6.

In step 610, a communication path between a mobile telephone cell site router and a first aggregation router of an MTSO subsystem is established. Step 610 may be performed in any of the ways described above, including by the mobile telephone cell site router (e.g., cell site router 170) and/or hub router 310 signaling the first aggregation router (e.g., aggregation router 140-1) to establish the communication path.

In certain embodiments, the communication path established in step 610 may comprise a single communication tunnel (e.g., communication tunnel 210-1) between the mobile telephone cell site router and the first aggregation router of the MTSO subsystem. In other embodiments, the communication path established in step 610 may comprise a first communication tunnel (e.g., communication tunnel 410-1) between the mobile telephone cell site router and hub router 310 and a second communication tunnel (e.g., communication tunnel 410-4) between hub router 310 and the first aggregation router of the MTSO subsystem. In such embodiments, hub router 310 may be communicatively disposed between and connected to the mobile telephone cell site router and the MTSO subsystem and may be configured to associate the first communication tunnel with the second communication tunnel to form the communication path, as described above.

In step 620, a backup communication path between the mobile telephone cell site router and a second aggregation router of the MTSO subsystem is pre-signaled. The backup communication path may be established in any of the ways described above. For example, the backup communication path may be pre-signaled as backup to the communication path established in step 610. The pre-signaling may be performed by a cell site router 170 and/or hub router 310 in any of the ways described above.

In certain embodiments, the backup communication path pre-signaled in step 620 may comprise a single communication tunnel (e.g., communication tunnel 210-2) between the mobile telephone cell site router and the second aggregation router of the MTSO subsystem. In other embodiments, the backup communication path pre-signaled in step 620 may comprise a first communication tunnel (e.g., communication tunnel 410-1) between the mobile telephone cell site router and hub router 310 and a second communication tunnel (e.g., communication tunnel 410-5) between hub router 310 and the second aggregation router of the MTSO subsystem. In such embodiments, hub router 310 may be configured to associate the first communication tunnel with the second communication tunnel to form the backup communication path, as described above.

In step 630, a traffic forwarding failure associated with the communication path established in step 610 is detected. Step 630 may be performed in any of the ways described above, including a cell site router 170 and/or hub router 310 using BFD to detect the traffic forwarding failure.

In step 640, network backhaul traffic directed to the first aggregation router via the communication path established in step 610 is automatically redirected to the second aggregation router via the backup communication path pre-signaled in step 620. Step 640 may be performed in any of the ways described above and in response to the detected traffic forwarding failure.

In step 650, at least one other backup communication path is pre-signaled between the mobile telephone cell site router and a backup MTSO subsystem. The other backup communication path(s) (e.g., communication paths 420-3 and 420-4) may be pre-signaled in any of the ways described above. For example, the backup communication path(s) may be pre-signaled as backup to the communication path established in step 610 and/or the backup communication path pre-signaled in step 620. The pre-signaling may be performed by hub router 310 in any of the ways described above.

In step 660, a traffic forwarding failure associated with the backup communication path pre-signaled in step 620 is detected. Step 660 may be performed in any of the ways described above, including hub router 310 using BFD to detect the traffic forwarding failure.

In step 670, network backhaul traffic directed to the MTSO subsystem via the communication path established in step 610 or the backup communication path pre-signaled in step 620 is automatically redirected to the backup MTSO subsystem via at least one of the other backup communication paths pre-signaled in step 650. Step 670 may be performed in any of the ways described above and in response to the detected traffic forwarding failure associated with the backup communication path pre-signaled in step 620.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A system comprising:
   a mobile telephone switching office subsystem having a first aggregation router and a second aggregation router; and
   a mobile telephone cell site router communicatively connected to said mobile telephone switching office subsystem via a network backhaul connection, said cell site router configured to
      establish at least one communication tunnel from said cell site router to said first aggregation router over said network backhaul connection,
      establish at least one backup communication tunnel from said cell site router to said second aggregation router over said network backhaul connection, wherein said at least one backup communication tunnel is pre-signaled as a backup to said at least one communication tunnel,
      detect at least one traffic forwarding failure associated with said at least one communication tunnel, and
      redirect network backhaul traffic directed to said first aggregation router via said at least one communication tunnel to said second aggregation router via said at least one backup communication tunnel in response to said at least one traffic forwarding failure.

2. The system of claim 1, wherein:
   said at least one communication tunnel comprises a plurality of pseudowires; and
   each of said pseudowires is dedicated to a different one of a plurality of services provided over a mobile telephone network.

3. The system of claim 2, wherein said plurality of services comprises an Evolution Data Optimized ("EVDO") based service, a Long Term Evolution based ("LTE") service, and a One Times Radio Transmission Technology ("1xRTT") based service.

4. The system of claim 2, wherein said at least one backup communication tunnel comprises a plurality of backup pseudowires pre-signaled as backup to said plurality of pseudowires.

5. The system of claim 1, wherein said at least one communication tunnel comprises an Ethernet virtual circuit and at least one pseudowire carried over said Ethernet virtual circuit, and said at least one backup communication tunnel comprises a backup Ethernet virtual circuit and at least one backup pseudowire carried over said backup Ethernet virtual circuit.

6. The system of claim 1, wherein said at least one communication tunnel forms at least one Multi-Protocol Label Switching ("MPLS") path between said cell site router and said first aggregation router.

7. The system of claim 1, further comprising:
   a mobile telephone cell site base station configured to communicate with at least one communication device located within a geographic cell by way of wireless communication signals;
   wherein said cell site router is connected to said cell site base station by a legacy cell site connection.

8. The system of claim 7, wherein said legacy cell site connection and said network backhaul connection comprise diverse connection technologies.

9. The system of claim 1, wherein said redirection of said network backhaul traffic comprises a substantially hitless transition from said at least one communication tunnel to said at least one backup communication tunnel.

10. A method comprising:
    establishing a communication path between a mobile telephone cell site router and a first aggregation router of a mobile telephone switching office subsystem;
    pre-signaling a backup communication path between said mobile telephone cell site router and a second aggregation router of said mobile telephone switching office subsystem;
    detecting a traffic forwarding failure associated with said communication path; and
    automatically redirecting network backhaul traffic directed to said first aggregation router via said communication path to said second aggregation router via said backup communication path in response to said traffic forwarding failure.

11. The method of claim 10, further comprising:
pre-signaling at least one other backup communication path between said mobile telephone cell site router and a backup mobile telephone switching office subsystem;
detecting a traffic forwarding failure associated with said backup communication path; and
automatically redirecting network backhaul traffic directed to said mobile telephone switching office subsystem via one of said communication path and said backup communication path to said backup mobile telephone switching office subsystem via said at least one other backup communication path in response to said traffic forwarding failure associated with said backup communication path.

12. The method of claim 10, further comprising breaking out select network traffic at a hub router communicatively disposed between and connected to said mobile telephone cell site router and said mobile telephone switching office subsystem for management by said hub router.

13. The method of claim 10, wherein said communication path comprises a communication tunnel between said mobile telephone cell site router and said first aggregation router of said mobile telephone switching office subsystem.

14. The method of claim 10, wherein:
said communication path comprises a first communication tunnel between said mobile telephone cell site router and a hub router and a second communication tunnel between said hub router and said first aggregation router of said mobile telephone switching office subsystem;
said hub router is communicatively disposed between and connected to said mobile telephone cell site router and said mobile telephone switching office subsystem; and
said hub router is configured to associate said first communication tunnel with said second communication tunnel to form said communication path.

15. The method of claim 10, tangibly embodied as computer-executable instructions on at least one non-transitory computer-readable medium.

* * * * *